(12) United States Patent
Pommerenke et al.

(10) Patent No.: US 8,482,602 B2
(45) Date of Patent: Jul. 9, 2013

(54) NON-DESTRUCTIVE ROTARY IMAGING

(75) Inventors: David Johannes Pommerenke, Rolla, MO (US); Reza Zoughi, Wildwood, MO (US); Mohammad Tayeb Ghasr, Rolla, MO (US); Joseph Tobias Case, Huntsville, AL (US); Andrew Dale McClanahan, Huntsville, AL (US); Kyle Lee Guinn, Olathe, KS (US)

(73) Assignee: The Curators of the University of Missouri, Columbia, MO (US)

( * ) Notice: Subject to any disclaimer, the term of this patent is extended or adjusted under 35 U.S.C. 154(b) by 820 days.

(21) Appl. No.: 12/618,575

(22) Filed: Nov. 13, 2009

(65) Prior Publication Data

US 2010/0128111 A1     May 27, 2010

Related U.S. Application Data

(60) Provisional application No. 61/199,089, filed on Nov. 13, 2008.

(51) Int. Cl.
*H04N 13/02* (2006.01)
(52) U.S. Cl.
USPC .............................. 348/50; 348/496; 348/49
(58) Field of Classification Search
None
See application file for complete search history.

(56) References Cited

U.S. PATENT DOCUMENTS

| | | | |
|---|---|---|---|
| 4,086,511 A | 4/1978 | Redman | |
| 4,721,901 A | 1/1988 | Ashley | |
| 5,227,800 A | 7/1993 | Huguenin et al. | |
| 5,933,120 A | 8/1999 | Manasson et al. | |
| 6,459,760 B1 * | 10/2002 | D'Ambrosio | 378/43 |
| 6,777,684 B1 | 8/2004 | Volkov et al. | |
| 6,927,691 B2 | 8/2005 | Yukl | |
| 6,974,415 B2 | 12/2005 | Cerwin et al. | |
| 7,034,746 B1 | 4/2006 | McMakin et al. | |
| 7,848,894 B2 * | 12/2010 | Motzer et al. | 702/35 |
| 2005/0041771 A1 * | 2/2005 | Kuo-Petravic et al. | 378/19 |
| 2007/0090294 A1 * | 4/2007 | Safai et al. | 250/341.8 |

OTHER PUBLICATIONS

J.T. Case, S. Kharkovsky, R. Zoughi, G. Steffes and F.L. Hepburn, "Millimeter wave holographical inspection of honeycomb composites", in Review of Progress in Quantitative Nondestructive Evaluation, vol. 27B, AIP Conference Proceedings, edited by D.O. Thompson and D.E. Chimenti, vol. 975, pp. 970-975, American Institute of Physics, Melville, NY, 2008.

M. Ravouri, M.A. Abou-Khousa, S. Kharkovsky, R. Zoughi and R. Austin "Microwave and Millimeter Wave Near-Field Methods for Evaluation of Radome Composites", Proceedings of the Thirty-Fourth Annual Review of the Quantitative Nondestructive Evaluation Conference, vol. 27B, pp. 976-981, Golden, CO, Jul. 22-Jul. 27, 2007.

(Continued)

*Primary Examiner* — Mohamed Ibrahim
(74) *Attorney, Agent, or Firm* — Senniger Powers LLP

(57) ABSTRACT

Non-destructive imaging of an object. An imaging head supported on a rotatable arm samples an electric field scattered by the object at a plurality of locations as the arm rotates about a central axis, with the locations corresponding to a defined spatial domain located remotely from the object. One or more processors execute computer-readable instructions for controlling rotation of the arm and generating a multi-dimensional profile representative of the object in the defined spatial domain based on the sampling.

18 Claims, 13 Drawing Sheets

OTHER PUBLICATIONS

John H. Gieske, "Evaluation of Scanners for C-Scan Imaging for Nondestructive Inspection of Aircraft", NDTnet [Online]. vol. 2, No. 11, Nov. 1997, <http://www.ndt.net/article/aero1197/sandia/sandia.htm>.

Danaher MotionTM, Direct Drive catalogue, [Online]. DDR model #D083M, <http://www.danahermotion.com/website/com/eng/download/document/Benefits_of_Using_Direct_Drive_Technology_Brochure.pdf>.

Danaher MotionTM S300 drive catalogue, <http://www.danahermotion.com/website/com/eng/download/document/200601161649450.S300_S600_Catalog.pdf>.

Danaher MotionTM AKM23 servo motor catalogue, <http://www.danahermotion.com/website/com/eng/download/document/200608011600510.AKM_Selection_Guide.pdf>.

MoogTM AC6305 Slip ring data sheet, <http://www.polysci.com/docs/AC6305_6310DS.pdf>.

L.J. Busse, "Three dimensional imaging using a frequency-domain synthetic aperture focusing technique", IEEE Transactions on Ultrasonics, ferroelectrics and Frequency Control, vol. 39, No. 2, pp. 174-179, 1992.

Agilent Technologies, Inc., Application Note, Exploring the Architectures of Network Analyzers, Agilent AN 1287-2, <http://cp.literature.agilent.com/litweb/pdf/5965-7708E.pdf>.

D. Rytting, "An analysis of vector measurements accuracy enhancement techniques", presented at the RF and Microwave Symp. Exhibition, 1980.

T. Nozokido, R. Libuchi, J. Bae and K. Mizuno, "Millimeter-wave scanning near-field anisotropy microscopy", Review of Scientific instruments, vol. 76, No. 3, pp. 033702-033702-6, 2005.

S. Kharkovsky and R. Zoughi, "Microwave and millimeter wave nondestructive testing and evaluation—overview and recent advances", IEEE Instrumentation and Measurement Magazine, vol. 10, No. 2, pp. 26-38, Apr. 2007.

D.M. Sheen, D.L. McMakin, and T.E. Hall, "Three-Dimensional Millimeter-Wave Imaging for Concealed Weapon Detection", IEEE Transactions on Microwave Theory and Techniques, vol. 49, No. 9, Sep. 2001.

S. Kharkovsky, F. Hepburn, J. Walker and R. Zoughi, "Nondestructive testing of the space shuttle external tank foam insulation using near-field and focused millimeter wave techniques", Materials Evaluation, vol. 63, N5, 2005, pp. 516-522.

S. Kharkovsky, J.T. Case, M. A. Abou-Khousa, R. Zoughi and F. Hepburn, "Millimeter wave detection of localized anomalies in the space shuttle external fuel tank insulating foam", IEEE Transactions on Instrumentation and Measurement, vol. 55, N4, Aug. 2006, pp. 1250-1257.

J. T. Case, S. Kharkovsky, R. Zoughi and F. Hepburn, "High resolution millimeter wave inspecting of the orbiter acreage heat tiles of the space shuttle", Proc. of the IEEE Instrumentation and Measurement Technology Conference, IMTC 2007, #7694, Warsaw, Poland, 2007.

S. Kharkovsky, R. Zoughi and F.L. Hepburn, "High resolution millimeter wave imaging of space shuttle fuel tank spray-on-foam insulation", Materials Evaluation, vol. 65, N12, 2007, pp. 1220-1229.

J. T. Case, S. Kharkovsky, and R. Zoughi, "Inspection of spray on foam insulation (SOFI) using microwave and millimeter wave synthetic aperture focusing and holography", Proc. of the IEEE Instrumentation and Measurement Technology Conference, IMTC 2006, pp. 2148-2153, Apr. 2006.

J. T. Case, J. Robbins, S. Kharkovsky, R. Zoughi and F. Hepburn, "Microwave and millimeter wave imaging of the space shuttle external tank spray on foam insulation (SOFI) using synthetic aperture focusing techniques (SAFT)", in Review of Progress in Quantitative Nondestructive Evaluation, vol. 25B, edited by D.O. Thompson and D.E. Chimenti, AIP Conference Proceedings, vol. 820, pp. 1546-1553, American Institute of Physics, Melville, NY, 2006.

* cited by examiner

→ : SCAN PATH
X: MEASUREMENT LOCATION

X – Sampling Location

X – Sampling Location

NON-DESTRUCTIVE ROTARY IMAGING

STATEMENT OF GOVERNMENT INTEREST

The U.S. Government has a paid-up license in this invention and the right in limited circumstances to require the patent owner to license others on reasonable terms as provided for by the terms of Grant No. NNM06AA08G awarded by the National Aeronautics and Space Administration.

BACKGROUND

The ever-increasing utility of new composite materials and structures in many critical applications, such as applications in the transportation and aerospace industries, has created a need for robust non-destructive imaging ("NDI") techniques capable of inspecting these structures. But standard NDI techniques, such as ultrasound, eddy current, etc., are not always capable of inspecting these structures. On the other hand, millimeter wave NDI techniques, which use near-field, lens-focused, synthetic aperture-focused and three-dimensional ("3D") holographical techniques, have been used for inspecting a wide range of aerospace composite materials and structures. In particular, synthetic millimeter wave imaging has shown utility for inspecting space shuttle external fuel tank spray-on foam insulation and its acreage heat tiles, as well as honeycomb composites similar to those used in aircraft radomes. Synthetically-focused millimeter wave imaging is fundamentally founded on measuring the electric field scattered from the structure-under-test ("SUT") over a given spatial domain. This imaging technique achieves focusing by compensating for reflected signal phase due to two-way travel from the transmitter to the receiver as transmitter moves along the SUT.

For example, in one conventional NDI application, a scanner collects data regarding a SUT in a two-dimensional ("2D") plane by moving a probe on a 2D grid, i.e., scanning. The typical 2D grid is a rectilinear grid represented in a Cartesian (x, y) format. Cartesian scanners are inherently slow because the scan must be performed step-wise in rows and columns. In step-wise scanning, the scanner first advances its probe in one direction for scanning along a row of the grid. The scanner must then stop its probe for reversing its direction. In other words, the probe scans one direction, moves a step up or down to the next row, and then scans in the opposite direction. FIG. 1 illustrates the back and forth scanning pattern of a Cartesian scanner. These Cartesian scanners waste a considerable amount of time in deceleration and acceleration at the beginning and end of each row/column. And this acceleration and deceleration comprises a major portion of the overall scan time for a Cartesian scanner, especially for small and/or sparse (i.e., scan grids with large step-size) scan areas. The necessary repeated direction changes also put mechanical stresses on the structure of a Cartesian scanner, especially the motors, which in turn reduces the total operating life of the Cartesian scanner.

SUMMARY

Aspects of the invention permit sampling the electric field scattered by an object by rotating an imager about a central axis and moving the imager radially with respect to the central axis during rotation. Based on the sampling, a multi-dimensional profile representative of the object in a defined spatial domain is generated.

Briefly, a system for non-destructive imaging of an object embodies aspects of the invention. The system includes a rotatable arm and an imaging head supported on the arm and facing the object during imaging. The imaging head samples an electric field scattered by the object at a plurality of locations as the arm rotates about a central axis, with the locations corresponding to a defined spatial domain located remotely from the object. The system also includes one or more processors configured to execute computer-readable instructions for controlling rotation of the arm and generating a multi-dimensional profile representative of the object in the defined spatial domain based on the sampling.

In another aspect, a system for non-destructive imaging of an object includes an imager facing the object for receiving information representative of a characteristic of the object, a rotational stage for rotating the imager about a central axis during imaging, and a radial stage for moving the imager radially relative to the central axis during imaging. The system also includes one or more processors configured to execute computer-readable instructions for controlling movement of the imager relative to the central axis and processing the information received from the imager during imaging.

Another aspect of the invention is directed to a method of generating a multi-dimensional profile of an object. The method includes orienting at least one imaging head toward the object and illuminating the object with an electric field. The electric field includes electromagnetic energy having a frequency greater than ultra high frequency and being scattered by the illuminated object. The method also includes rotating the imaging head relative to a central axis, moving the imaging head radially relative to the central axis while rotating the imaging head relative to the central axis, and sampling the scattered electric field with the imaging head at a plurality of locations as the imaging head rotates and moves radially relative to the central axis. The locations correspond to a defined spatial domain located remotely from the object. The method further includes generating a multi-dimensional profile representative of the object in the defined spatial domain based on the sampling.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 12B-2E demonstrate exemplary scan results from scanning the SUT illustrated in FIG. 12A.

Corresponding reference characters indicate corresponding parts throughout the drawings.

DETAILED DESCRIPTION

Figure 1:
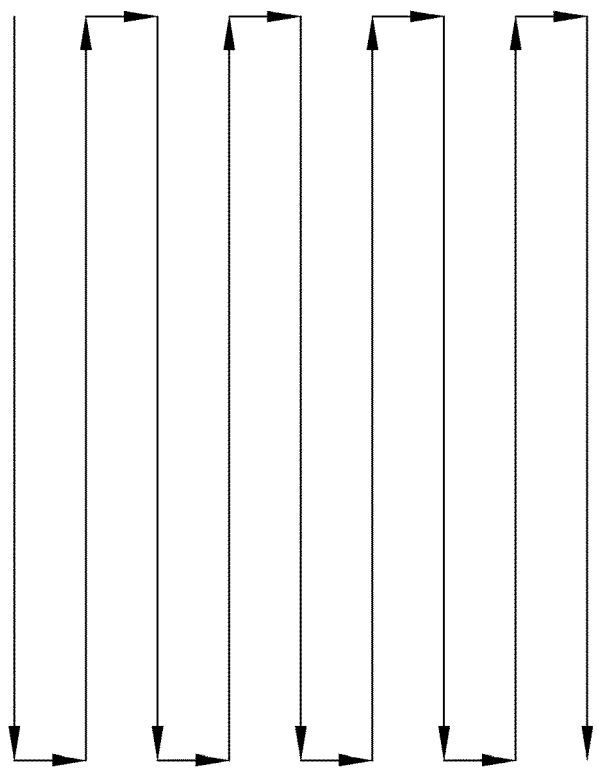
FIG. 1 illustrates the rectilinear scanning pattern of a prior art Cartesian scanner.
Figure 2:
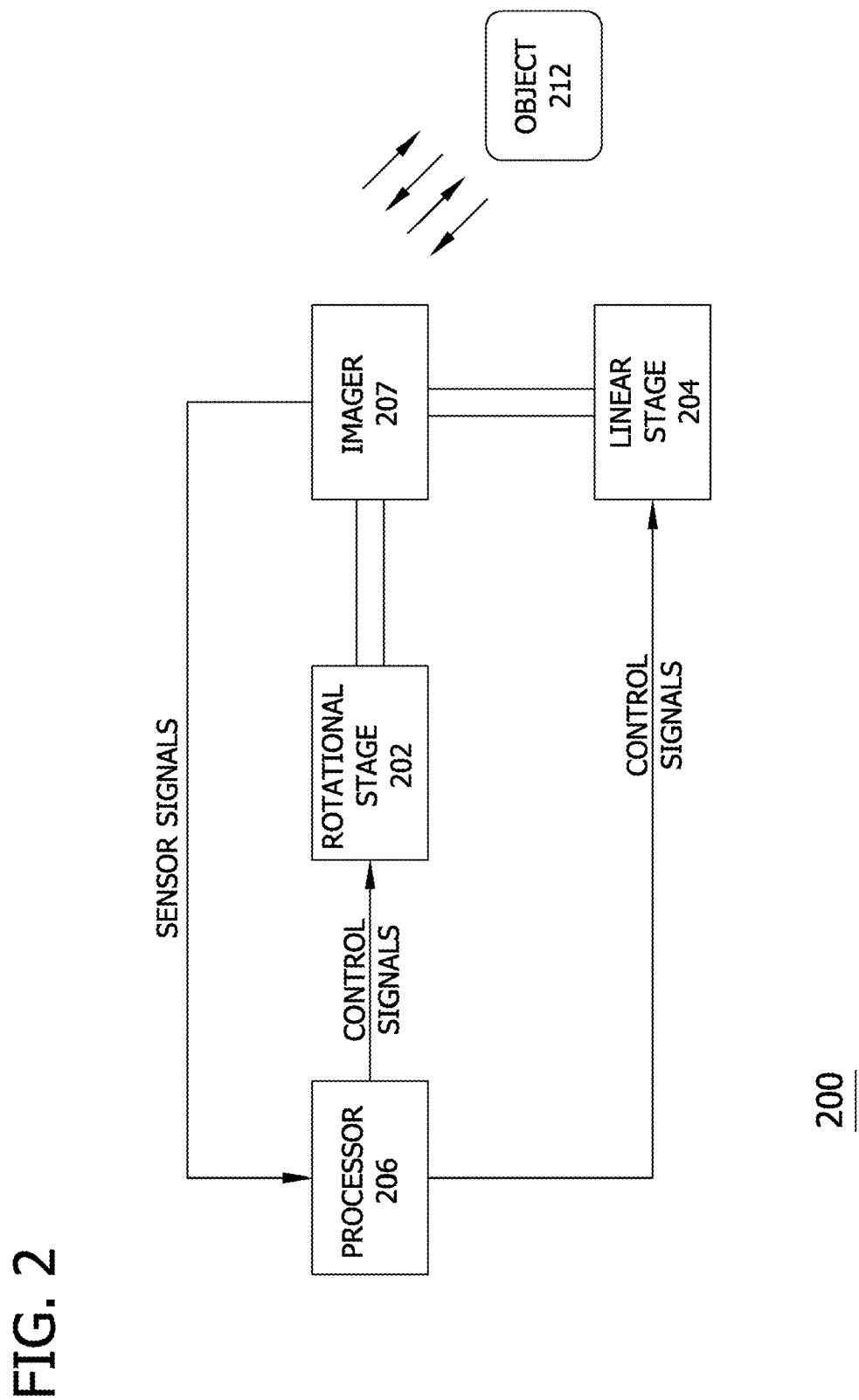
FIG. 2 illustrates a rotary scanner according to an embodiment of the present invention in block diagram form.

Referring now to FIG. 2, a scanning system, or scanner, embodying aspects of the present invention is shown generally at reference character 200. In the illustrated embodiment, the system 200 comprises a rotational stage 202 and a linear, or radial, stage 204. According to aspects of the invention, rotational stage 202 is responsive to one or more processors 206 for driving an imager 207 to impart rotational motion on the imager 207. Linear stage 204 is responsive to processor 206 for driving imager 207 to impart radial motion, relative to rotational stage 202, on imager 207. In operation, imager 207 illuminates an object 212 with electromagnetic radiation in, for example, the millimeter wave range, and measures the resulting electric field scattered by object 212. In turn, imager 207 receives this information representative of the electric field scattered by object 212 and sends sensor signals back to processor 206. In one embodiment, processor 206 is configured for generating a multi-dimensional image of object 212 based on the sensor signals. In this manner, scanning system 200 permits robust non-destructive multi-dimensional imaging of various structures using millimeter wave electromagnetic radiation. In particular, scanning system 200 measures an electric field scattered by object 212, i.e., a structure-under-test ("SUT"), over a defined spatial domain.

Electromagnetic ("EM") fields in the millimeter wave range, i.e., the frequency range of 30 GHz to 300 GHz and corresponding wavelengths of 10 mm to 1 mm, have many unique characteristics, which make them particularly suitable for subsurface sensing purposes. For example, millimeter waves can be used to interrogate dielectric materials and produce images of their interiors. These waves, unlike sound waves, do not experience severe attenuation while propagating in free-space, thus enabling non-contact measurements. Since these waves have relatively small wavelengths, images produces by millimeter waves have relatively high spatial resolutions. Millimeter wave frequency spectrum covers several conventional waveguide bands, each of which has a relatively wide range of operating frequency. Thus, using swept-frequency measurements permits the generation of images with relatively fine depth-resolution.

Because EM radiation in the millimeter wave range is non-ionizing, the imaging equipment and procedures operating in the millimeter wave range are generally considered hazard-free and can be readily deployed anywhere without the need for special imaging environments. In contrast, x-ray imaging systems require users to observe exposure guidelines and wear equipment intended to limit exposure to the x-ray radiation.

Figure 3:
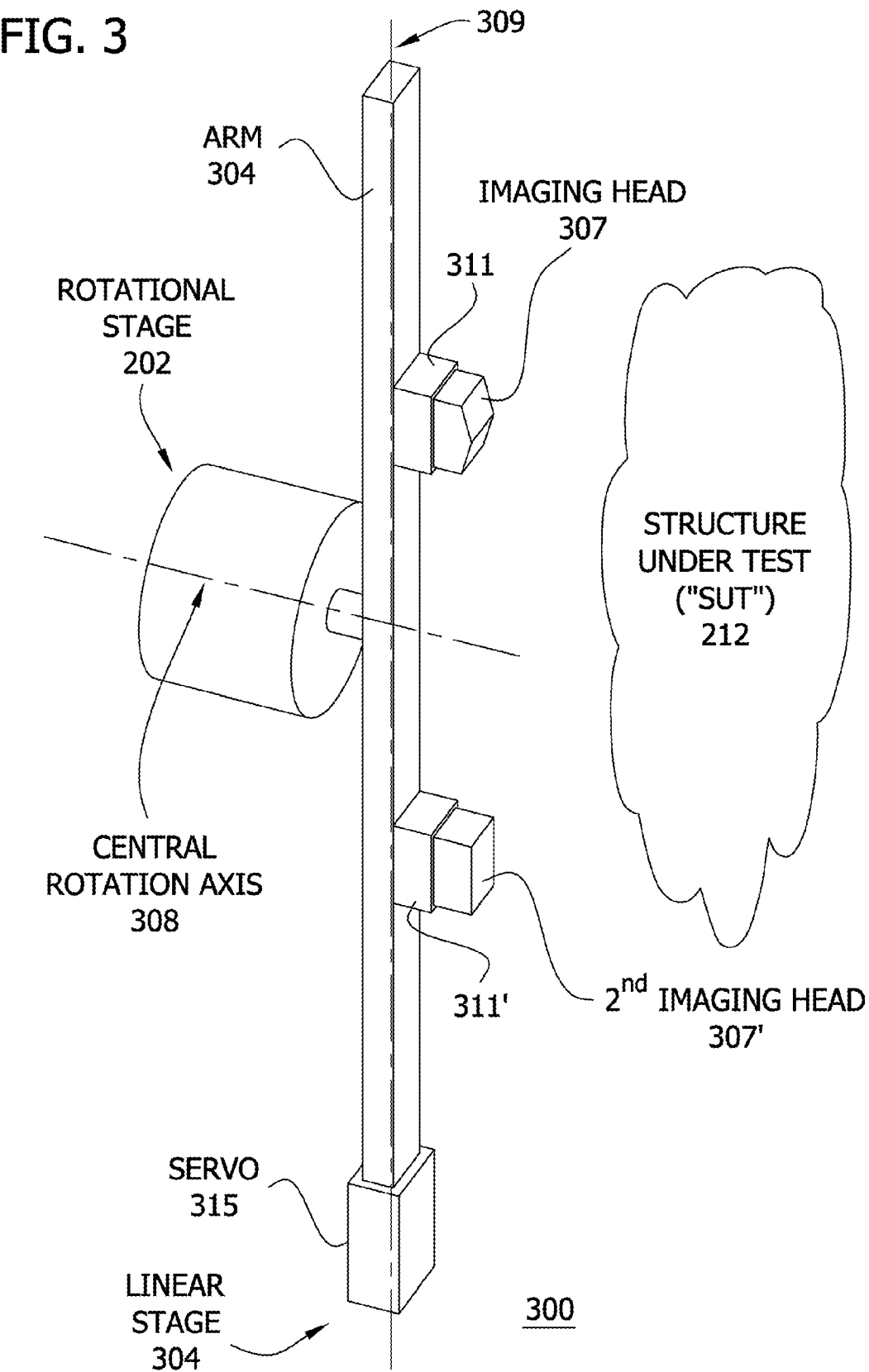
FIG. 3 is a perspective view of the rotary scanner of FIG. 2.
Figure 4:
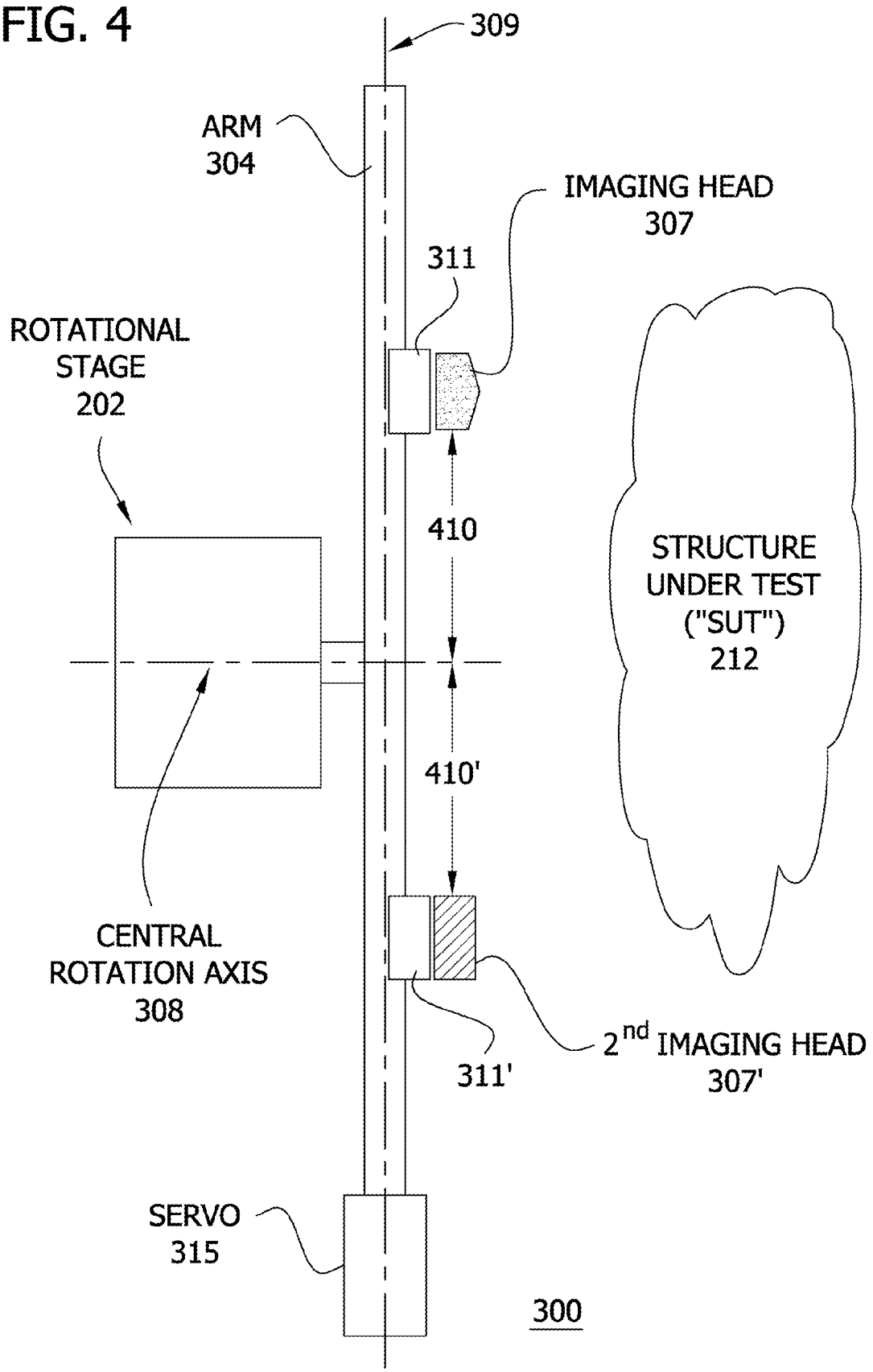
FIG. 4 is a side view of the rotary scanner of FIG. 2.

Referring now to FIG. 3 and FIG. 4, in one embodiment, a system 300 for non-destructive imaging of an object comprises a rotatable arm 304 and at least one imaging head 307 supported on arm 304. Imaging head 307 is oriented such that it faces the object during imaging. In this embodiment, imaging head 307 samples an electric field scattered by object 212 at a plurality of locations as arm 304 rotates about a central axis 308. Arm 304 rotates about central axis 308 at a predetermined angular velocity measured in, for example, revolutions per minute ("RPM"). A longitudinal axis 309 of arm 304 traverses the radius of a circle defined by arm 304 as it rotates. While FIG. 3 and FIG. 4 illustrate a right angle between central axis 308 and longitudinal axis 309 of arm 304, embodiments embodying aspects of the present invention may further accommodate a tilt angle between longitudinal axis 309 of arm 304 and central axis 308. Because arm 304 supports imaging head 307, during its rotation, imaging head 307 travels in a generally circular motion relative to central axis 308. In addition, imaging head 307 is configured for movement along longitudinal axis 309 of arm 304. Imaging head 307 travels radially relative to central axis 308 along a length 410 of longitudinal axis 309 and rotationally relative to central axis 308 as arm 304 rotates. While moving, imaging head 307 selectively samples the scattered electric field at locations corresponding to a defined spatial domain. Advantageously, scanning system 300 is capable of obtaining sampled measurements of an electric field using a generally circular scan area as demonstrated in FIG. 5A using polar coordinate positioning. In one embodiment, sampling head 307 moves along length 410 in a stepwise fashion, indicated at 520, resulting in the set of concentric circle sampling patterns as demonstrated in FIG. 5A. In another embodiment, sampling head 307 moves along length 410 in a continuous fashion, resulting in a spiral sampling pattern as demonstrated in FIG. 5B.

FIG. 3 and FIG. 4 further illustrate aspects of scanning system 300, which is configured to sample an electric field scattered by SUT 212. Imaging head 307 is supported on arm 304. In this embodiment, imaging head 307 is mounted on a carriage 311 configured to move imaging head 307 along length 410 of longitudinal axis 309 of rotatable arm 304. A second carriage 311' is configured to move a second imaging head 307' along a length 410' of longitudinal axis 309 of rotatable arm 304. In the alternative, second carriage 311' is configured to move a counter balance weight (not shown) along length 410' of longitudinal axis 309 of rotatable arm 304. In operation, carriages 311 and 311' move simultaneously in the same direction relative to the central axis 308, i.e., radially toward the central axis 308 or radially away from central axis 308. In one embodiment, linear stage 204 includes a servo 315, which controls the movement of carriages 311 and 311' radially relative to central axis 308. Those skilled in the art are familiar with various traveler mechanisms, including a counter-rotating screw bar, suitable for moving a carriage or the like along a linear path. Imaging head 307' is also oriented facing the SUT 212 during imaging.

Figure 6:
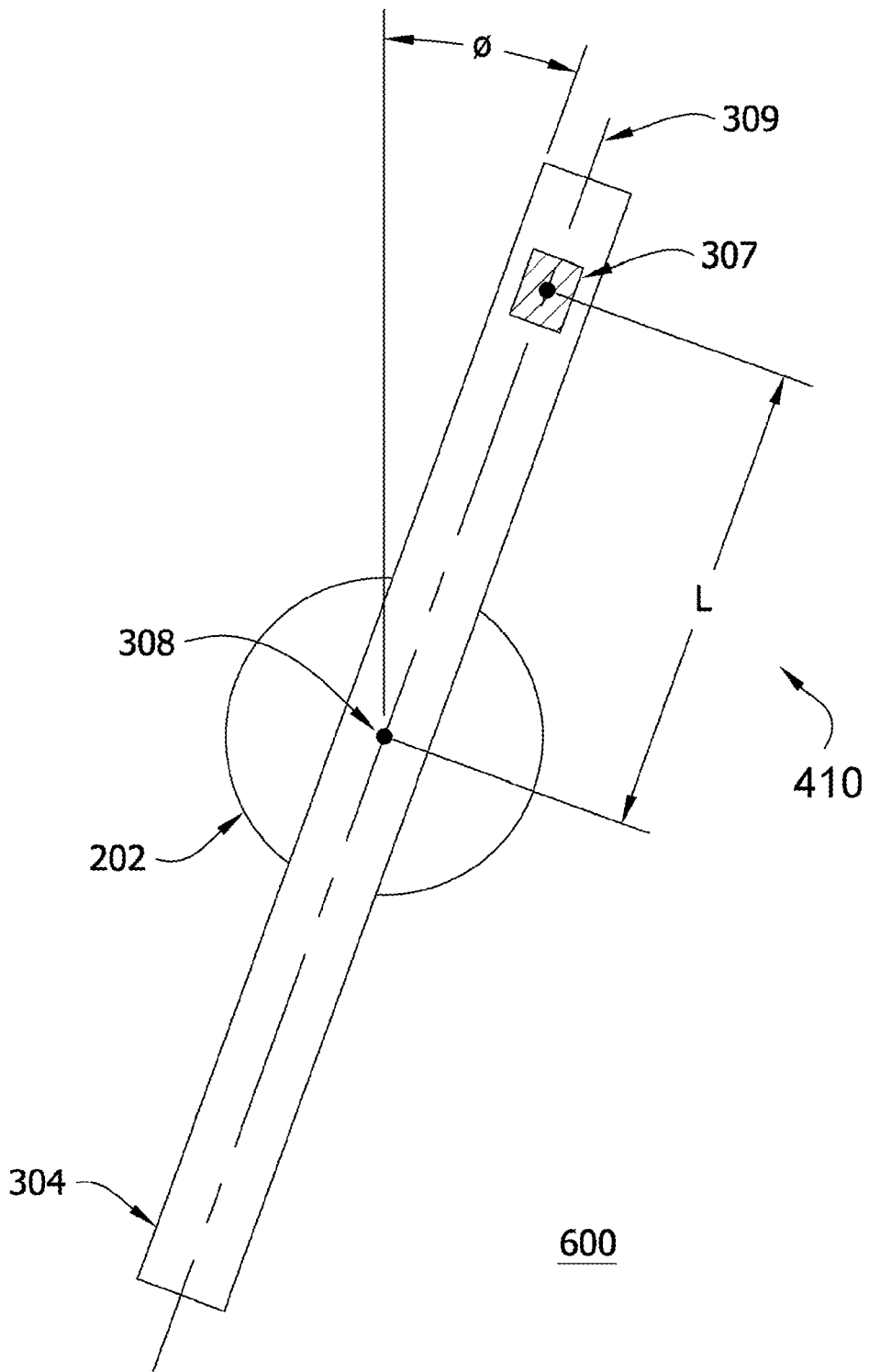
FIG. 6 is a front view of a rotary scanner according to another embodiment of the present invention.

FIG. 6 illustrates an alternative embodiment of a rotary scanning system 600 in which a single imaging head 307 is supported on rotatable arm 304. In this embodiment, imaging head 307 likewise travels along length 410 of arm 304 during scanning. That is, imaging head 307 travels radially relative to central axis 308 along the longitudinal axis 309 of arm 304 while the arm 304 rotates relative to the central axis 308.

Figure 7:
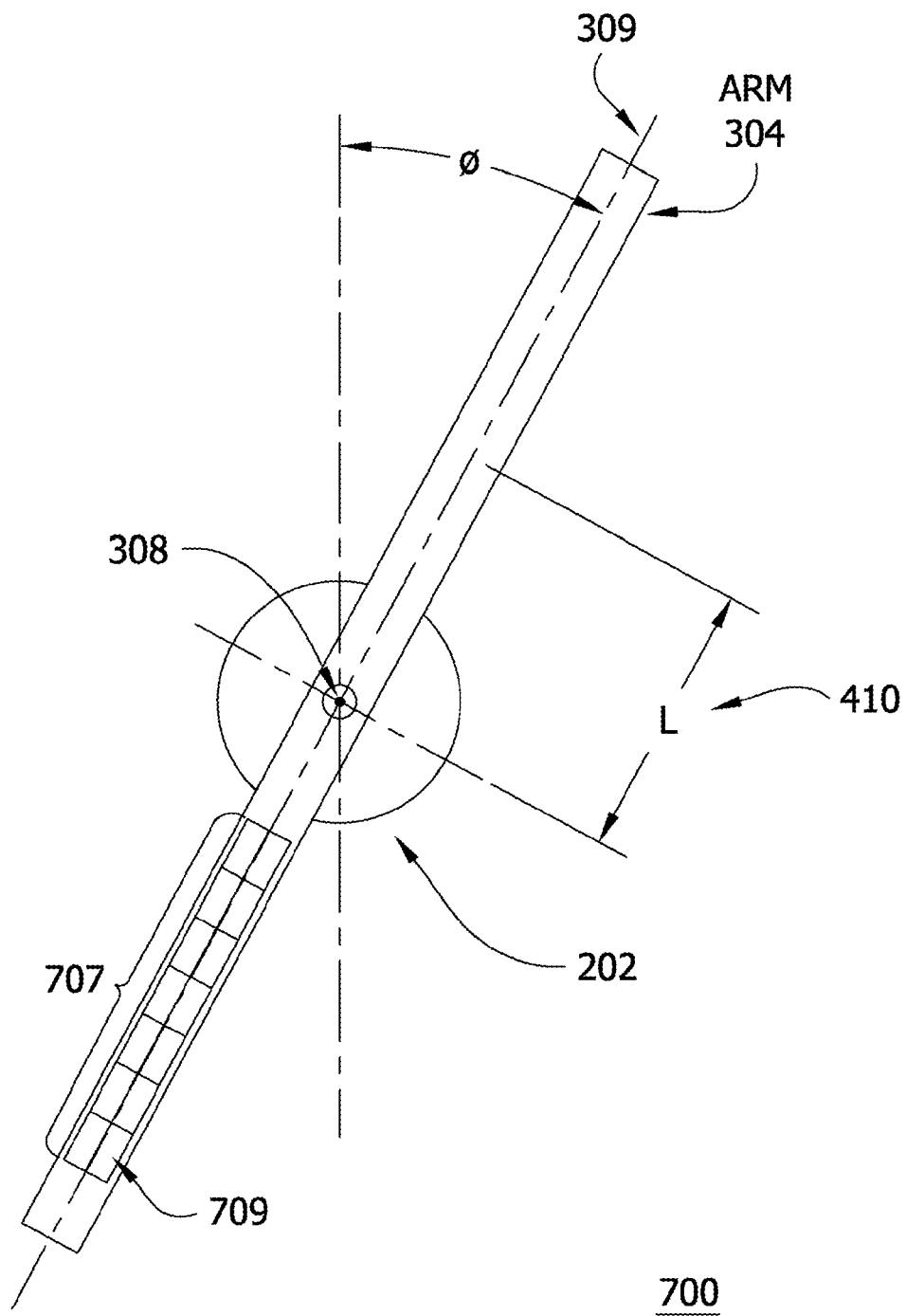
FIG. 7 is a front view of a rotary scanner according to yet another embodiment of the present invention.

In yet another embodiment demonstrated in FIG. 7, imager 207 comprises an array of imaging heads 707, wherein each imaging head or sensor 709 in array 707 selectively samples a scattered electric field as arm 304 rotates about central axis 308. According to aspects of the invention, the one or more array of imaging heads or sensors 709 are supported along, for example, longitudinal axis 309 on rotatable arm 304 in a generally linear pattern.

Figure 8:
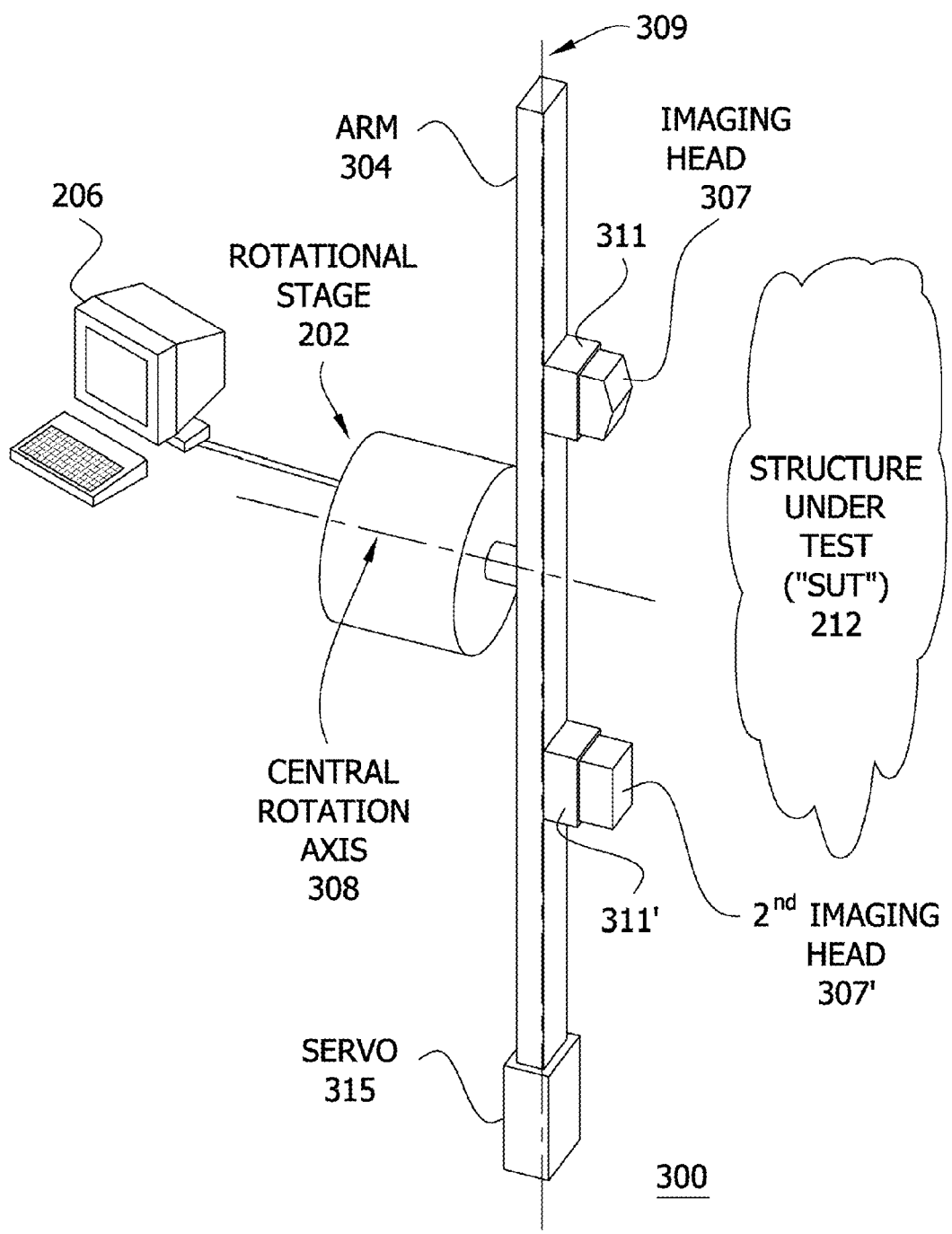
FIG. 8 illustrates a rotary scanner according to an embodiment of the present invention and a processor according to an embodiment of the present invention.

Referring now to FIG. 8, an embodiment of system 300 for non-destructive imaging includes processor 206 in the form of, for example, a personal computer, configured to execute computer-readable instructions for controlling operation of rotatable arm 304 and generating a multi-dimensional profile representative of object 212 in the defined spatial domain based on the sampling. In one embodiment, the computer-readable instructions for controlling rotation of arm 304 includes instructions for moving imaging head 307 along length 410 of the longitudinal axis 309 of rotatable arm 304. FIG. 8 illustrates aspects of the computer-readable instructions that are executable by processor 206 for controlling movement of the at least one imaging head 307 relative to SUT 212. In this embodiment, processor 206 uses various parameters for specifying a desired scan area 900 (see FIG. 9).

Figure 9:
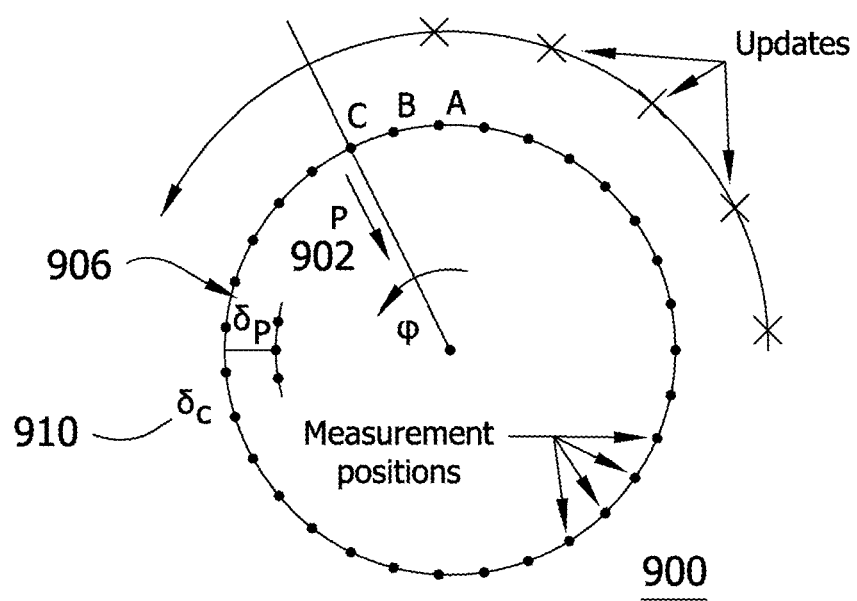
FIG. 9 illustrates exemplary measurement positions and relative update positions according to an embodiment of the present invention.

As demonstrated in FIG. 9, the parameters include, for example, a radius 902 of the desired scan area 900, ρ, the step sizes 906 along the radius 902, δρ, and the step size along the circumference of any given circle in the scan area 910, δc, i.e., an arc length. In one embodiment, the computer-executable instructions for moving imaging head(s) 307 include instructions for operating servo 315 (i.e., linear, or radial, stage 204) that moves carriages 311 and 311' along length 410 and 410', respectively, of longitudinal axis 309 of rotatable arm 304. The computer-executable instructions for controlling rotation of arm 304 in this embodiment include instructions for controlling the speed of rotation. The exemplary computer-executable instructions for controlling rotation of rotatable arm 304 may further include instructions for receiving feedback indicating angular position of rotatable arm 304, speed of rotation of rotatable arm 304, and a time stamp. During operation of imaging system 200 (or 300, 600, or 800), processor 206 executes computer-executable instructions for generating the multi-dimensional profile of the object in the spatial domain based on the sampling. According to one embodiment, the sampling information is received wirelessly from imaging head 307, for example, via one or more wireless ultra wideband communication links. In another embodiment, information is received via a wired connection between imaging head 307 and processor 206.

Figure 5A:
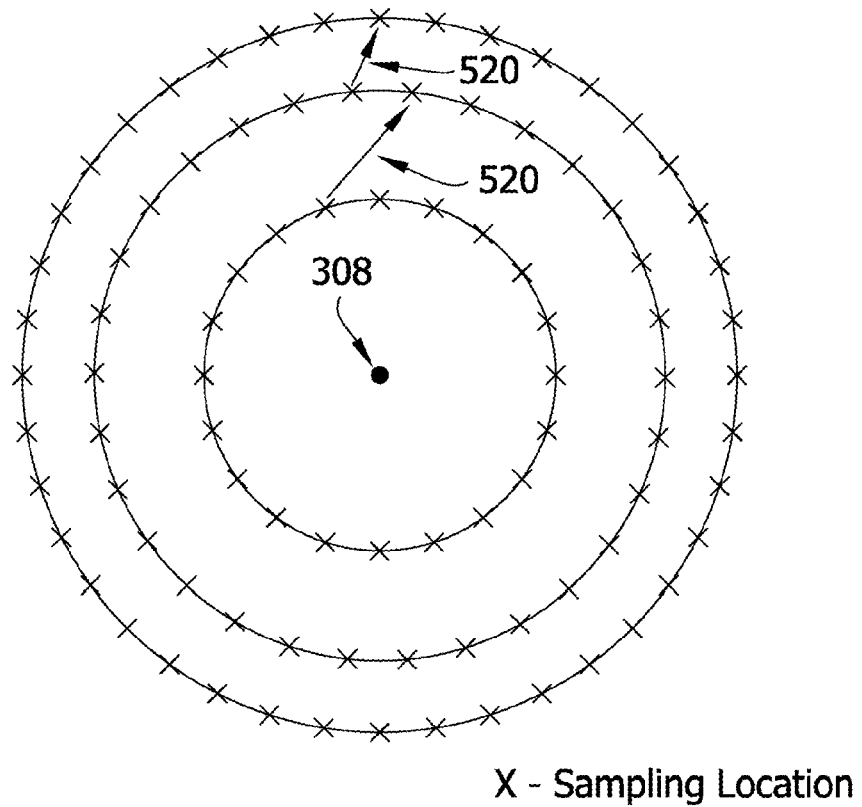
FIGS. 5A and 5B illustrate exemplary scanning patterns according to embodiments of the present invention.
Figure 5B:
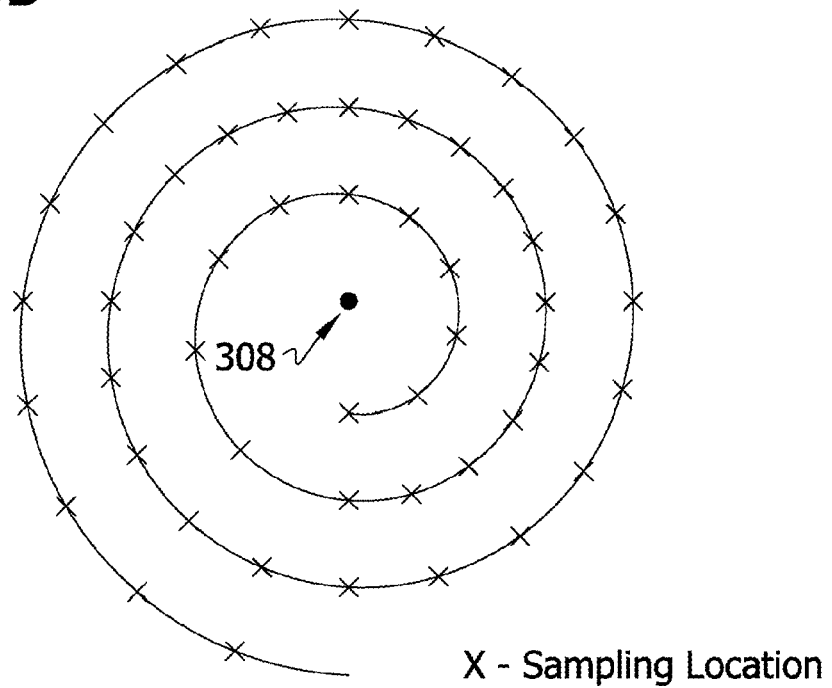

In operation, the specified radius and step size information illustrated in FIG. 9 are used by processor 206 to generate a list of sampling locations within the spatial domain of the sampling area at the beginning of the scan, as demonstrated by the "X" positions denoted in FIGS. 5A and 5B. These sampling locations are arranged at points on concentric circles (FIG. 5A) or at points along a spiral path (FIG. 5B). For example, FIG. 9 demonstrates evenly-spaced sampling locations (including A, B, and C) generated along the circumference of a circle of radius 902 δρ. Therefore, when imaging head 307 is positioned at length 410 along longitudinal axis 309 of arm 304 corresponding to radius 902 in FIG. 9 and arm 304 rotates 360 degrees, sampling head 307 will pass over each of the sampling locations in FIG. 9 in the course of exactly one rotation of arm 304. During a typical scan, however, information regarding the angular position of arm 304 may be sparse compared to the sampling positions, the time of a given sampling can be linearly extrapolated from past position updates as shown in FIG. 9. Furthermore, if sampling head 307 fails, for whatever reason, to obtain a sampling at a given sampling location, or obtained sampling is compromised due to a data communication failure, the sampling at the missed location can be interpolated based on sampling values obtained at adjacent sampling locations.

To minimize the number of power, control, and data cables running from rotating arm 304 to processor 206, various components can advantageously be installed or otherwise mount on the back of arm 304. One of ordinary skill in the art will recognize that these components may include, but are not limited to, a servo controller, a USB hub for routing information received from imaging head 307, a USB data acquisition card (DAQ), and a DC power supply. In one embodiment, an off the shelf slip-ring hub (e.g., Model number AC6305 from Moog) routes power, control, and USB to arm 304. In this exemplary configuration, the number of cables connecting to rotating arm 304 (passing through the slip ring) are limited to three AC power lines for powering servo 315 and the DC power supply, three 24 V lines for the servo controller digital control, three lines for the slip-ring bus, and 6 lines for the USB. The USB cable is kept shielded, for example, up to 1" from the slip-ring on each side to maintain its impedance and minimize the unshielded portion only to a short distance through the slip-ring. Slip-rings are typically not suited for high data rate buses such as the USB, but instead typically transfer low data rate according to the CANbus data communication protocol. However, due to the compact slip-ring design with low impedance contacts and by alternating the shield and power lines in-between the data lines of the USB, the distortion to the USB data through the slip-ring is minimized. Utilizing a USB interface for data transfer allows for a multitude of options (off the shelves or custom made) in data acquisitions and controllers.

Figure 10:
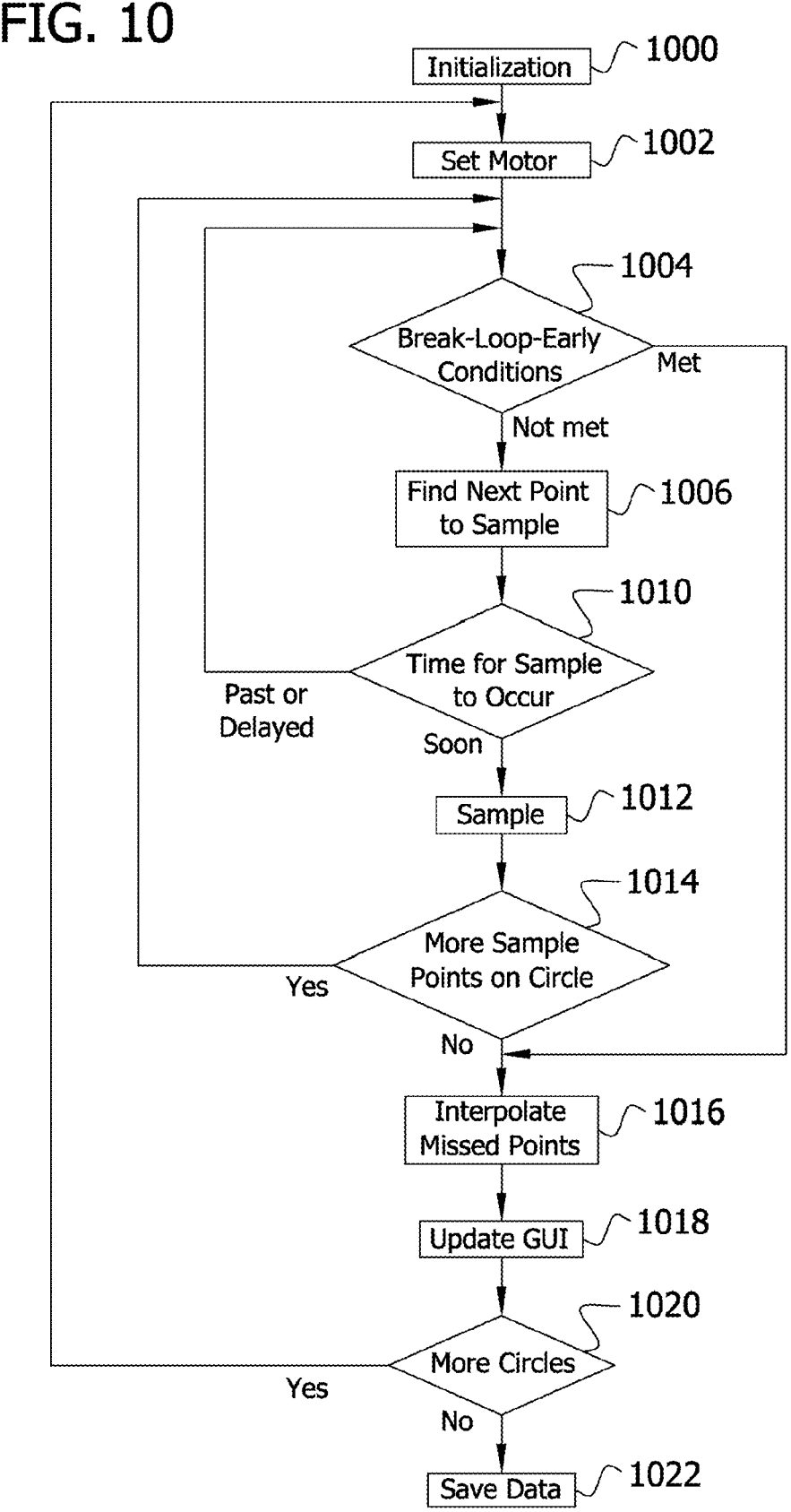
FIG. 10 is an exemplary flowchart of a scanning algorithm according to an embodiment of the present invention.

Furthermore, FIG. 10 demonstrates aspects of a method of generating a multi-dimensional profile of object 212. At least one imaging head 307 is oriented facing object 212. The object 212 is then illuminated with an electric field. In one embodiment, the electric field comprises electromagnetic energy having a frequency greater than ultra high frequency. It is understood in the art that ultrahigh frequency designates the range between 300 megahertz ("MHz") and 3,000 MHz. For example, the millimeter wave frequency designates a range above ultrahigh frequency between 30 GHz to 300 GHz. In this embodiment, upon illumination, SUT 212 absorbs or otherwise scatters the electric field about SUT 212. In order to generate the multi-dimensional profile, imaging head 307 is rotated relative to central axis 308, while also being moved radially along length 410 relative to central axis 308 during rotation. Imaging head 307 samples the scattered electric field at a plurality of defined spatial locations during the rotational and radial movement. As noted above, FIGS. 5A and 5B illustrate a concentric circle sampling pattern and spiral path sampling pattern respectively.

FIG. 10 illustrates an exemplary flowchart illustrating a Scan Thread Algorithm for controlling the rotation of an arm, the movement of sampling, or imaging, heads along a length of a longitudinal or radial axis, and otherwise controlling the sampling process for a concentric circles sampling pattern. At step 1000, the scanning system is initialized prior to imaging SUT 212. During initialization, the imager, such as imager 207, is positioned in its initial starting position (if it is not already so positioned). The system performs other initialization procedures, such as calculating positions to be measured, allocating memory, initializing a graphical user interface, and determining sampling read time (e.g., by averaging the time for 1000 samplings). In one embodiment of the present invention, the imager is positioned on the rotatable arm at or substantially near the central point 308. In another embodiment, the imager is positioned at or substantially near the end of arm 309. At 1002, the rotational stage (including a motor for rotating the arm) sets the arm at a predetermined initial angular position in space relative to the SUT. Similarly, the linear stage sets the carriage to a predetermined initial radial position in space relative to the SUT (the rho loop). In this manner, the scanning system positions the imager at a predetermined initial position in space. After initialization has completed, the system's processor, among other things, calculates a rotational speed for the rotational stage and determines the Boolean vector of the sampling points, at which time rotation of the linear stage commences (the phi loop). The algorithm then tests at step 1004 for conditions that indicate that sampling is complete for a given circle in the set of concentric circles in the sampling pattern. If the conditions are met, the algorithm continues at step 1016. Otherwise, the next sampling point is determined (step 1010) and the time for the sampling is determined (step 1010). If it is determined that the time for sampling has passed, i.e., the sampling point was missed, the algorithm returns to step 1004. If the time has not passed, the sampling is performed at step 1012. The algorithm then determines if there are additional non-missed sampling points on the given circle, and if so, the algorithm again returns to step 1004. Otherwise, sampling for the given concentric circle has been completed, and any missed sampling points are interpolated according to the algorithm at step 1016. The algorithm then updates the graphic user interface in pseudo real-time with the sampled information at step 1018. At step 1020, the algorithm repeats for any additional concentric circles that remain in the scanning pattern. Once all circles have been completed, the sampled information, the interpolated information, and other data and information is stored at step 1022.

Figure 11:
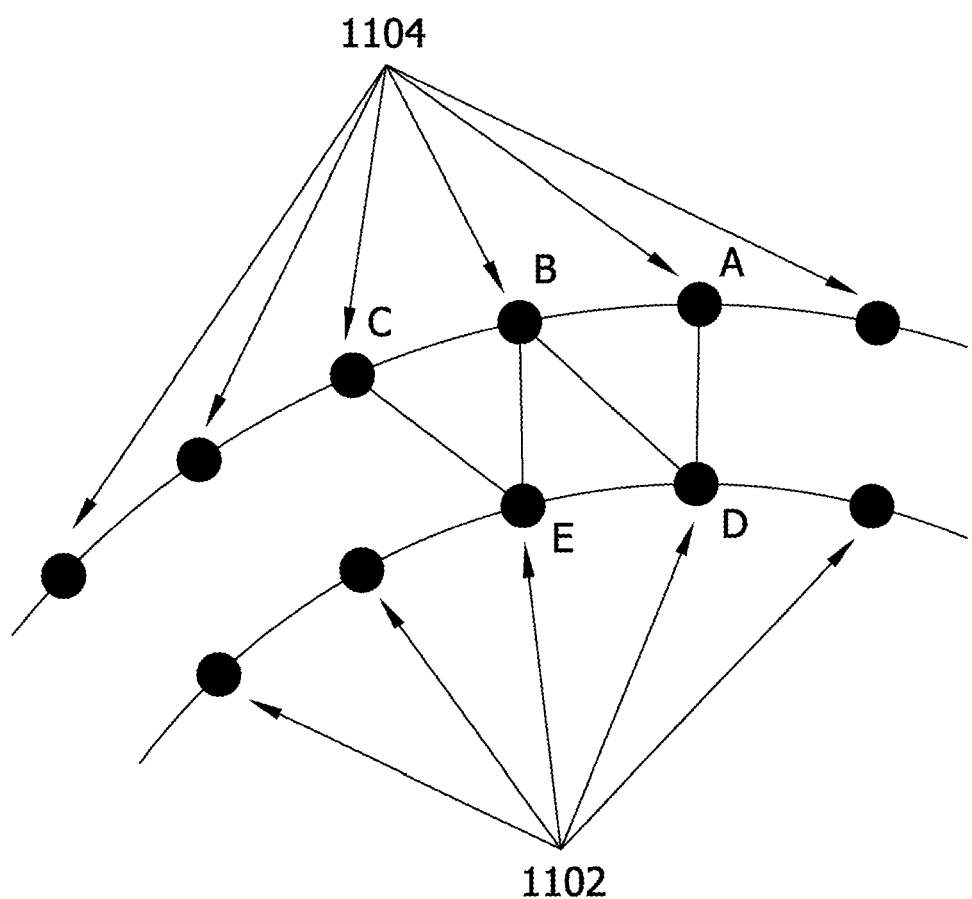
FIG. 11 demonstrates an exemplary mesh of triangles formed by the measurement positions used for displaying scan results in pseudo real-time.

Scan measurements, e.g., phase or magnitude of a reflection coefficient acquired by one or more probes, can be graphically represented in pseudo real-time as the scan processes. According to aspects of the present invention, the scan area can be divided into a mesh of triangles, as illustrated in FIG. 11. The triangles are formed by connecting measurement positions (A, B, C, D, E, . . . ) between adjacent concentric circles, as shown in FIG. 11. Each triangle is then filled with a gradient based on the measured values at the three vertices.

Figure 12A:
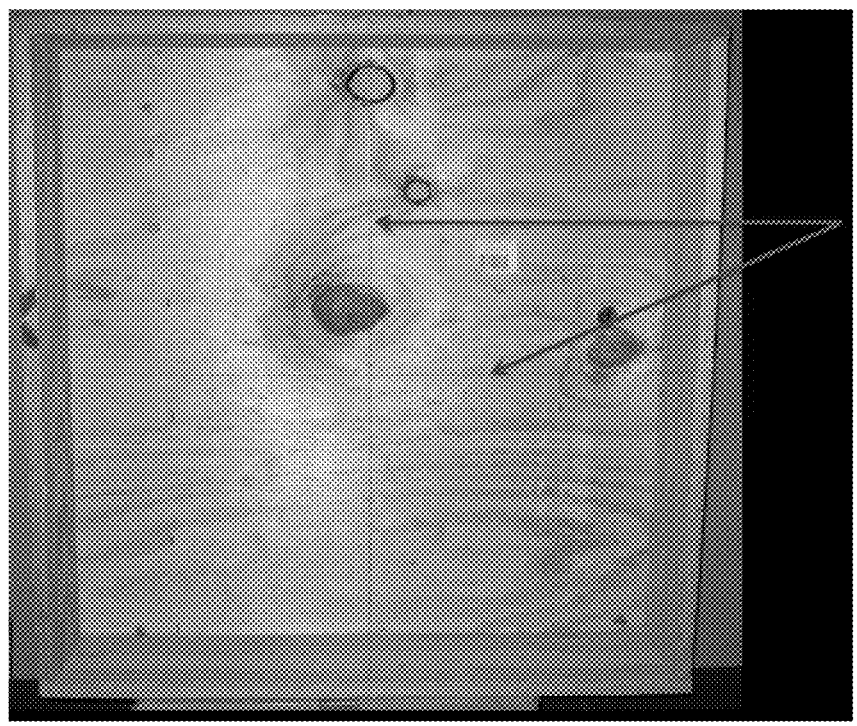
FIG. 12A illustrates an exemplary SUT consisting of an open-ended enclosure and two wires spanning the opening of the enclosure, with each wire running perpendicular to the other.
Figures 12B, 12C:
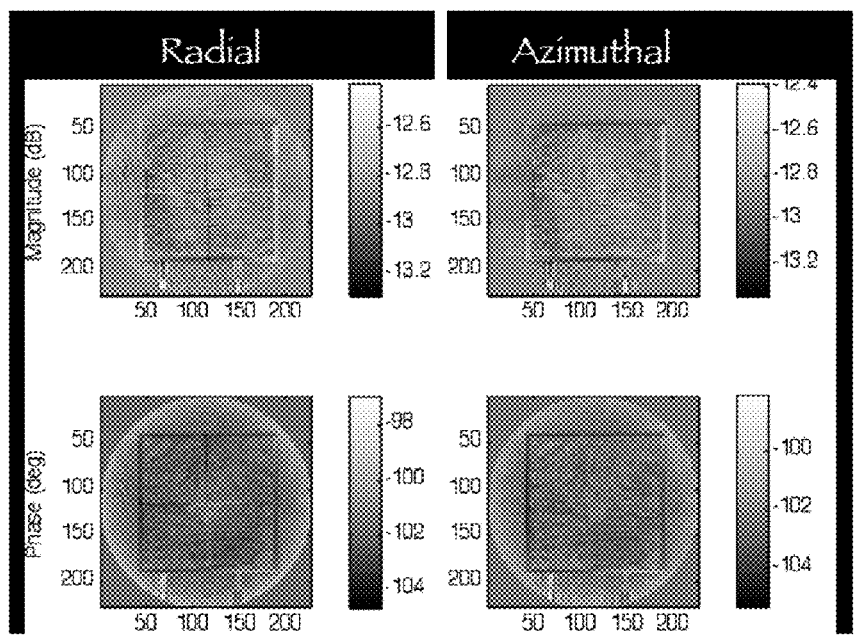
Figures 12D, 12E:
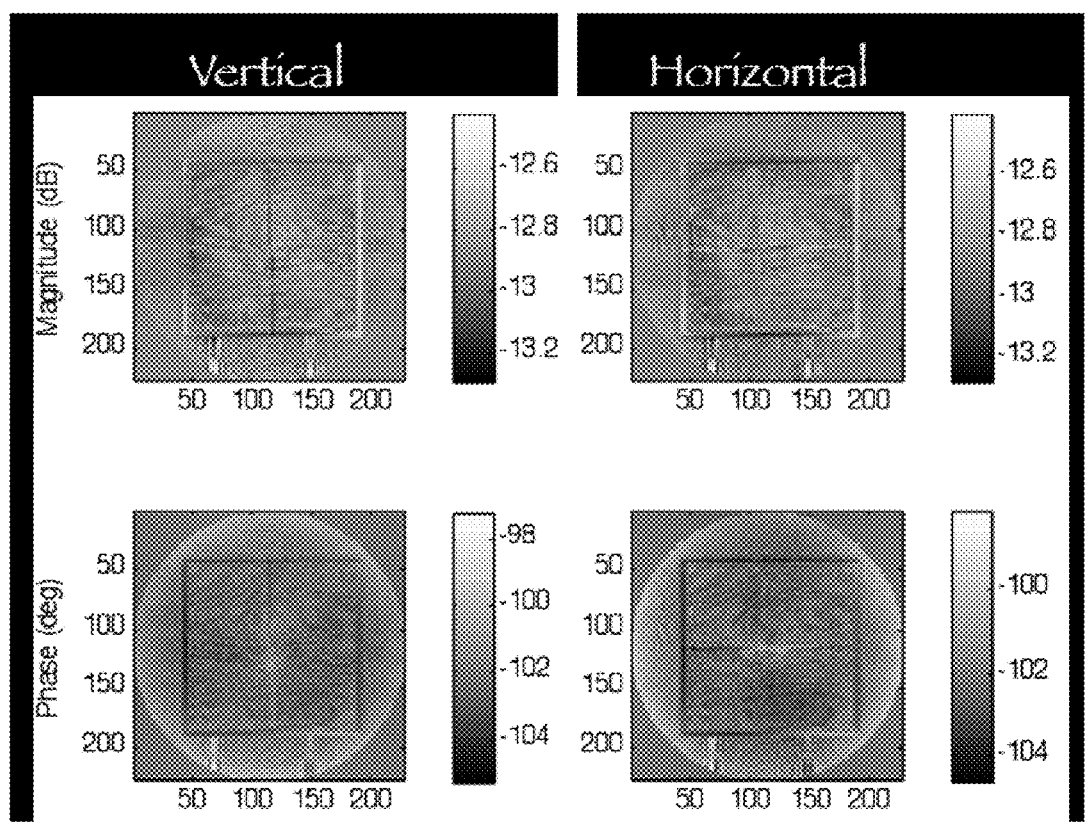

The following non-limiting examples are provided to further illustrate aspects of the present invention. Several experiments were conducted using a prototype imaging system using embodiments of the current invention to confirm its operation. FIG. 12A demonstrates a rear view of one exemplary SUT scanned by the imaging system as described herein. As shown, the SUT generally has a pair of crossed wires on the back side of a piece of plywood. The imaging system sampled the electric field scattered by the SUT in a pattern defined by the following illustrative parameters:

Sampled frequency range: 30 Ghz-45 Ghz (Q-band)
Radius of the spatial sampling area: 60 cm
Step size ($\delta\rho$ and $\delta c$): >1 mm
Standoff Distance: 70 mm
Rotational speed: 250 RPM (max)

FIG. 9 illustrates these parameters with respect to a sampling pattern. While the illustrative parameters given above indicate a single value for each parameter, more than value can be specified per parameter to define the spatial sampling area.

FIGS. 12B-12E demonstrate one exemplary set of experimental results. In this experiment, an imager-SUT standoff distance of 70 millimeters was maintained while scanning the SUT. As demonstrated by FIGS. 12B-12E, radial (FIG. 12B) and azimuthal (FIG. 12C) images of polarized targets, e.g., linear wires as imaged through a wooden enclosure, can be produced using two separate rotary scans. These images can thereafter be transformed into vertical (FIG. 12D) and horizontal (FIG. 12E) polarization images. The results clearly show significant and positive attributes of this overall rotary imaging system.

A system (i.e., system 200, 300, 600, or 800) embodying aspects of the invention for non-destructive imaging of object 212 comprises rotatable arm 304 and imaging head 307 supported on arm 304. Imaging head 307 is oriented to face object 212 during imaging. An electric field source illuminates object 212 with an electric field having a frequency greater than ultra high frequency. For instance, imaging head 307 comprises a millimeter wave transmitter/receiver, or transceiver. During imaging, imaging head 307 samples the electric field scattered by object 212 at a plurality of locations as arm 304 rotates about central axis 308. These locations correspond to a defined spatial domain located remotely from object 212. The system also includes one or more processors 206 configured to execute computer-readable instructions for controlling rotation of arm 304 and generating a multi-dimensional profile representative of object 212 in the defined spatial domain based on the sampling. As described above, imaging head 307 is movable radially relative to central axis 308 along longitudinal axis 309 of the arm 304. In one embodiment, imaging head 307 is mounted on carriage 311 supported on arm 304. The carriage 311 is responsive to processor 206 for moving imaging head 307 along length 410 of arm 304.

In an alternative embodiment, the system includes two or more imaging heads 307 and 307', each facing object 212 during imaging and configured for sampling the electric field scattered by object 212 at a plurality of locations as arm 304 rotates about central axis 308. For example, arm 304 supports a pair of carriages 311 and 311'. First imaging head 307 is mounted on first carriage 311 and second imaging head 307' is mounted on second carriage 311'. In this instance, first and second carriages 311, 311' are responsive to processor 206 for moving first and second imaging heads 307, 307' along length 410, 410' of arm 304. Moreover, in the embodiment illustrated in FIG. 3, arm 304 extends from central axis 308 in two directions and first and second carriages 311, 311' are supported on arm 304 substantially opposite each other relative to central axis 308. In another embodiment, imaging head 307 is at a polarization orthogonal to imaging head 307', where the sampling data obtained from imaging heads 307 and 307' can be converted to images representing a single polarization at any angle using appropriate mathematical relations as known in the art. In another embodiment, imaging head 307 rotates during rotation of arm 304, such that imaging head 307 maintains its polarization. In yet another alternative embodiment, arm 304 supports imaging head 307 and a corresponding counterweight substantially opposite imaging head 307 relative to central axis 308.

Aspects of the invention are also directed to imaging head 307 having the array of sensors 709 supported along a length of arm 304.

In another embodiment, a system for non-destructive imaging of object 212 comprises imager 207 (or 307 and 707) oriented such that it faces object 212. Imager 207 in this embodiment receives information representative of a characteristic of object 212, such as a millimeter wave characteristic, a temperature characteristic, or an electromagnetic emission characteristic, such as light emission. In other embodiments, imager 307 receives ultrasound, x-ray, video, or other characteristics of object 212. The system also includes rotational stage 202 for rotating imager 207 about central axis 308 during imaging and linear stage 204 for moving imager 207 radially relative to central axis 308 during imaging. In one embodiment, rotational stage 202 is a direct drive rotary ("DDR") servo motor, driving a worm gear or any other suitable torque conversion scheme, thereby reducing the rotary axis to a single motor and eliminating reduction gears, power transfer mechanisms, and/or support bearings. One or more processors 206 are configured to execute computer-readable instructions for controlling movement of imager 207 relative to central axis 308 and processing the information received from imager 207 during imaging. Rotational stage 202 includes, for example, a drive motor and rotatable arm 304 driven by the motor. Linear stage 204 includes one or more carriages 311 and 311' supported on the rotational stage, particularly, arm 304. In this embodiment, imager 207 is mounted on carriage 311, and carriage 311 is responsive to processor 206 for moving imager 207 along length 410 of arm 304.

In operation, a method of generating a multi-dimensional profile of object 212 embodying aspects of the invention includes orienting at least one imaging head 307 to face object 212 and illuminating object 212 with an electric field. The electric field comprises, for example, electromagnetic energy having a frequency greater than ultra high frequency and is scattered by object 212. The method also includes rotating imaging head 307 relative to central axis 308 and moving imaging head 307 radially relative to central axis 308 while rotating imaging head 307 relative to central axis 308. By sampling the scattered electric field with imaging head 307 at a plurality of locations as imaging head 307 rotates and moves radially relative to central axis 308, the method permits generating a multi-dimensional profile representative of object 212 in a defined spatial domain located remotely from object 212.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention. Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of the present invention or the embodiments(s) thereof, the articles "a", "an", "the" and "said" are intended to mean that there are one or more of the elements. The terms "comprising", "including" and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods, without departing from the scope of the invention, it is intended that all matter contained in the above description and shown in the accompanying drawings shall be interpreted as illustrative and not in a limiting sense.

In view of the above, it will be seen that the several objects of the invention are achieved and other advantageous results attained.

What is claimed is:

1. A system for non-destructive imaging of an object, said system comprising:
   an electric field source for illuminating the object with an electric field, said electric field comprising electromagnetic energy having a frequency greater than ultra high frequency and being reflected by the object illuminated thereby;
   a rotatable arm;
   an imaging head supported on the arm and facing the object during imaging, said imaging head sampling the electric field reflected by the object at a plurality of locations as the arm rotates about a central axis, said plurality of locations corresponding to a defined spatial domain located remotely from the object and in a plane perpendicular to the central axis; and
   one or more processors configured to execute computer-readable instructions for:
      controlling rotation of the arm; and
      generating a multi-dimensional profile representative of the object in the defined spatial domain based on the sampling.

2. The system of claim 1, wherein the imaging head comprises a first imaging head, and further comprising a second imaging head supported on the arm and oriented toward the object during imaging, said second imaging head sampling the electric field reflected by the object at a plurality of locations as the arm rotates about the central axis.

3. The system of claim 2, further comprising a first carriage and a second carriage supported on the arm, said first imaging head being mounted on the first carriage and said second imaging head being mounted on the second carriage, said first and second carriages being responsive to the processor for moving the first and second imaging heads along a length of the arm.

4. The system of claim 3, wherein the arm extends from the central axis in two directions and wherein the first and second carriages are supported on the arm substantially opposite each other relative to the central axis.

5. The system of claim 1, wherein the imaging head is moveable radially relative to the central axis along a longitudinal axis of the arm.

6. The system of claim 1, further comprising a carriage supported on the arm, said imaging head being mounted on the carriage and said carriage being responsive to the processor for moving the imaging head along a length of the arm.

7. The system of claim 1, further comprising a counterweight supported on the arm, wherein the arm extends from the central axis in two directions and wherein the imaging head and the counterweight are supported on the arm substantially opposite each other relative to the central axis.

8. The system of claim 1, wherein the imaging head comprises an array of sensors supported along a length of the arm.

9. A system for non-destructive imaging of an object, said system comprising:
   an electric field source for illuminating the object with an electric field, said electric field comprising electromagnetic energy having a frequency greater than ultra high frequency and being scattered by the object illuminated thereby;
   an imager facing the object for receiving information reflected from the object and representative of a characteristic of the object, wherein the information received by the imager is representative of the electric field scattered by the object;
   a rotational stage for rotating the imager about a central axis in a defined spatial domain parallel to an imaging surface of the object during imaging;

a radial stage for moving the imager in the defined spatial domain radially relative to the central axis during imaging; and one or more processors configured to execute computer-readable instructions for:

controlling movement of the imager in the defined spatial domain relative to the central axis; and processing the information received from the imager during imaging.

10. The system of claim 9, wherein the radial stage includes a carriage supported on the rotational stage, said imager being mounted on the carriage and said carriage being responsive to the processor for moving the imager.

11. The system of claim 10, wherein the imager comprises first and second imaging heads, and wherein the radial stage comprises first and second second carriages supported on the rotational stage, said first imaging head being mounted on the first carriage and said first carriage being responsive to the processor for moving the first imaging head, said second imaging imaging head being mounted on the second carriage and said second carriage being responsive to the processor for moving the second imaging head.

12. The system of claim 11, wherein the rotational stage comprises a drive motor and a rotatable arm driven thereby, said arm extending from the central axis in at least two directions, and wherein the first and second carriages are supported on the arm substantially opposite each other relative to the central axis.

13. The system of claim 9, wherein the rotational stage comprises a drive motor and a rotatable arm driven thereby, said arm extending from the central axis.

14. The system of claim 9, wherein the characteristic of the object includes at least one of a millimeter wave characteristic, a temperature characteristic, and a light emission characteristic.

15. The system of claim 9, wherein the imager comprises an array of sensors supported along a length of the rotational stage.

16. The system of claim 9, wherein the rotational stage includes a slip-ring bus, said bus transmitting sampling data from the imager to the processor via a USB transmission protocol.

17. A method of generating a multi-dimensional profile of an object, said method comprising:

orienting at least one imaging head on a rotatable arm facing the object;

illuminating the object with an electric field, said electric field comprising electromagnetic energy having a frequency greater than ultra high frequency and being reflected by the object illuminated thereby toward the imaging head;

rotating the imaging head relative to a central axis perpendicular to the central axis;

moving the imaging head radially along a longitudinal axis of the rotatable arm relative to the central axis while rotating the imaging head relative to the central axis;

sampling the reflected electric field with the imaging head at a plurality of locations as the imaging head rotates relative to the central axis and moves radially along the longitudinal axis of the rotating arm, said locations corresponding to a defined spatial domain located remotely from the object and in a plane perpendicular to the central axis; and generating a multi-dimensional profile representative of the object in the defined spatial domain based on the sampling.

18. The method of claim 17, further comprising acquiring sampling data via a slip-ring bus.

* * * * *